(12) United States Patent
Hansen

(10) Patent No.: US 7,309,208 B2
(45) Date of Patent: Dec. 18, 2007

(54) TURNING GEAR DRIVE SYSTEM

(75) Inventor: William Sigurd Hansen, Canton, GA (US)

(73) Assignee: General Electric Company, Schenectady, NY (US)

( * ) Notice: Subject to any disclaimer, the term of this patent is extended or adjusted under 35 U.S.C. 154(b) by 166 days.

(21) Appl. No.: 10/906,477

(22) Filed: Feb. 22, 2005

(65) Prior Publication Data

US 2006/0188372 A1  Aug. 24, 2006

(51) Int. Cl.
*F01D 25/34* (2006.01)

(52) U.S. Cl. ...................................... 415/123

(58) Field of Classification Search ............... 415/123, 415/124.1, 122.1; 475/265, 259, 290
See application file for complete search history.

(56) References Cited

U.S. PATENT DOCUMENTS

| | | | | |
|---|---|---|---|---|
| 2,245,175 A | * | 6/1941 | Bany | 415/20 |
| 2,910,894 A | * | 11/1959 | Kenney | 74/810.1 |
| 4,323,354 A | * | 4/1982 | Blanchard | 440/75 |
| 4,909,200 A | | 3/1990 | Sumi | 123/179 |
| 5,433,079 A | | 7/1995 | Badami et al. | 60/660 |
| 5,606,859 A | | 3/1997 | Ploshkin | 60/669 |
| 6,155,395 A | | 12/2000 | Braford, Jr. | 192/48.3 |
| 6,165,096 A | * | 12/2000 | Seith | 475/265 |
| 6,746,354 B1 | * | 6/2004 | Ziemer | 475/5 |

FOREIGN PATENT DOCUMENTS

EP  0967105 A2  12/1999
JP  2003172437  6/2003

OTHER PUBLICATIONS

European Search Report, Application No. 06250889.0-2315.

* cited by examiner

*Primary Examiner*—Ninh H. Nguyen
(74) *Attorney, Agent, or Firm*—Cantor Colburn LLP

(57) ABSTRACT

A clutch assembly for a turning gear includes an overspeed clutch, an output shaft, and a centrifugal clutch. The overspeed clutch is disposed at the input shaft. The output shaft is in mechanical communication with the input shaft via the overspeed clutch. The centrifugal clutch is disposed at a portion of the output shaft.

12 Claims, 3 Drawing Sheets

TURNING GEAR DRIVE SYSTEM

BACKGROUND OF THE INVENTION

The present invention relates to a turning gear for a turbine and, more particularly, to a clutch assembly for use in a turning gear for a steam turbine.

Steam turbines are commonly used to drive electrical generators in power plants. A typical steam turbine is a massive yet intricate piece of machinery that must be started up and shut down in a controlled manner in order to protect each of many steam turbine components from damage due to thermal stresses. Damage due to thermal stresses often results from uneven cooling of components during shutdown or uneven heating of components during startup.

An example of a steam turbine component that is particularly sensitive to thermal stresses during shutdown or startup, is a turbine rotor. For example, the turbine rotor of a steam turbine that is being started up with gland sealing steam cut in will bow or distort if left stationary even for a few minutes. Similarly, a stationary turbine rotor that is cooling down following a shutdown may also bow in a short time. If, however, the turbine rotor of a steam turbine that is being started up or shut down is forced to rotate at a slow speed during the startup or shutdown procedure, the turbine rotor will not bow. Rotation of the turbine rotor during startup and shutdown at the slow speed allows the turbine rotor to endure the thermal stresses without distortion or bowing. In order to provide rotation of the turbine rotor during startup and shutdown, a turning gear is typically installed, which keeps the turbine rotor rotating slowly (e.g., 3–5 revolutions per minute (rpm)) during the startup or shutdown procedure.

The turning gear typically includes an electric motor, reduction gearing and an engagement mechanism. The electric motor typically operates at a high speed of rotation, such as 1100 rpm, and therefore requires reduction gearing to reduce a speed of rotation of the turbine rotor to about 3–5 rpm. The reduction gearing transfers torque from an output shaft of the electric motor to the turbine rotor via a sequence of gears that provide, for example, a 200 to 1 ratio between the speed of rotation the electric motor and the speed of rotation of the turbine rotor. The engagement mechanism provides a mechanism for engaging or disengaging the reduction gearing to the turbine rotor.

It is common for steam turbines to experience a certain amount of steam leakage. In some cases, the amount of steam leakage is enough to increase the speed of rotation of the turbine rotor. In the past, when the speed of rotation of the turbine rotor increased above that which was the result of torque from the turning gear, a torque was transmitted from the turbine rotor to the reduction gearing. The reduction gearing then fed the torque to the electric motor by turning the output shaft of the electric motor, for example, at 200 times the speed of the turbine rotor. The torque fed to the electric motor was often sufficient to overspeed and damage or destroy reduction gearing closest to the electric motor, and therefore also, the turning gear.

To prevent damage or destruction of the turning gear, an overspeed protection was developed which allowed the turning gear to disengage the turbine rotor if the speed of rotation of the turbine rotor reached a predetermined level. While such protection has proved useful in preventing damage or destruction of the turning gear, such protection is not without faults. If an operator fails to notice disengagement of the turning gear, the rotor may eventually coast to a stop if the steam leakage is subsequently reduced, thereby allowing the turbine rotor to become bowed or distorted. If the operator notices disengagement of the turning gear, the turning gear may be re-engaged, however, this process could be repeated extensively thereby decreasing operator attention to other important aspects of operation. Furthermore, an operator may bypass safety controls that prevent re-engagement and force a rotating turbine rotor to damage the turning gear.

Thus, it is desired to develop a turning gear that overcomes the above-mentioned shortcomings.

BRIEF DESCRIPTION OF THE INVENTION

Exemplary embodiments of the invention include a clutch assembly for a turning gear. The clutch assembly includes an overspeed clutch, an output shaft, and a centrifugal clutch. The overspeed clutch is disposed at the input shaft. The output shaft is in mechanical communication with the input shaft via the overspeed clutch. The centrifugal clutch is disposed at a portion of the output shaft.

Further exemplary embodiments of the invention include a turning gear assembly for a turbine rotor. The turning gear assembly includes a motor, a clutch assembly, a reduction gear assembly and a disengagement assembly. The motor is configured to produce a first rotational output at a first speed. The clutch assembly is in mechanical communication with the electric motor. The reduction gear assembly is in mechanical communication with the clutch assembly. The reduction gear assembly is configured to produce a second rotational output at a second speed in response to a first rotational output from the electric motor via the clutch assembly. The second speed is lower than the first speed. The reduction gear assembly is configured to translate the second rotational output to the turbine rotor in response to engagement of the reduction gear assembly to the turbine rotor. The disengagement assembly is configured to allow disengagement of the reduction gear assembly from the turbine rotor.

The above, and other objects, features and advantages of the present invention will become apparent from the following description read in conjunction with the accompanying drawings, in which like reference numerals designate the same elements.

BRIEF DESCRIPTION OF THE DRAWINGS

Referring now to the drawings wherein like elements are numbered alike in the several FIGURES.

DETAILED DESCRIPTION OF THE INVENTION

Figure 1:
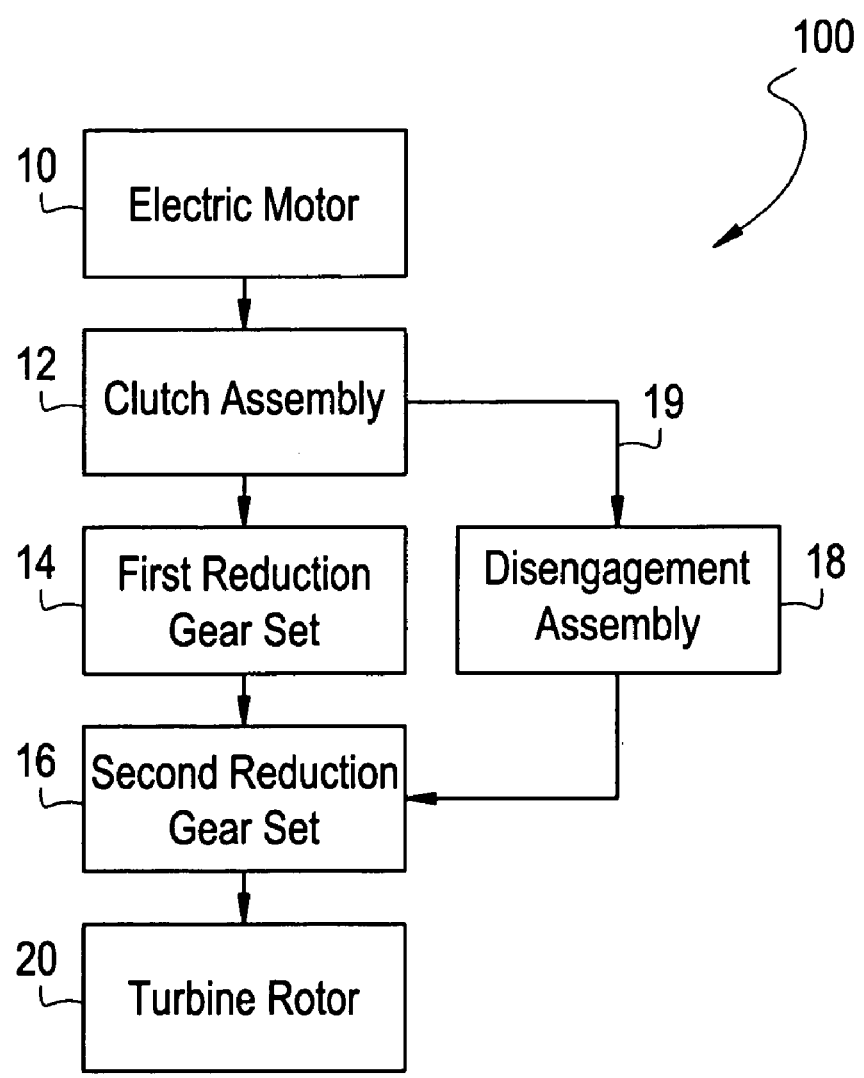
FIG. 1 is a block diagram of a turning gear assembly according to an exemplary embodiment.

FIG. 1 illustrates a block diagram of a turning gear assembly according to an exemplary embodiment. The turning gear assembly 100 includes an electric motor 10, a clutch assembly 12, a first gear reduction set 14, a second gear reduction set 16, a disengagement assembly 18, and a turbine rotor 20. It should be noted that although the disclosure describes a turning gear assembly having an electric motor, any other suitable means of providing a rotational output is also envisioned.

The electric motor 10 of an exemplary embodiment is a synchronous alternating current (AC) motor, however, any suitable electric motor is envisioned including a direct current (DC) motor. The electric motor 10 converts electrical energy into mechanical energy in the form of torque exerted on a motor shaft 22 (see FIG. 2), causing the motor shaft 22 to rotate at a first speed. The motor shaft 22 translates an output of the electric motor 10 to the first reduction gear set 14 via the clutch assembly 12.

The first reduction gear set 14 is in mechanical communication with the electric motor 10 via the clutch assembly 12. Thus, rotation of the motor shaft 22 at the first speed is translated to the first reduction gear set 14 as a rotational input. The first reduction gear set 14 comprises a plurality of gears (not shown) configured to convert the rotational input at the first speed to a rotational output at a second speed. The second speed is lower than the first speed. In an exemplary embodiment, the first reduction gear set 14 includes a planetary gear reduction set (not shown), however, a hypoid gear reduction set or any other suitable reduction gear set is also envisioned. The first reduction gear set 14 is in mechanical communication with the second reduction gear set 16 and provides the rotational output at the second speed as an input to the second reduction gear set 16.

The second reduction gear set 16 includes a plurality of gears configured to convert the rotational output at a second speed from the first reduction gear set 14 to a turning gear rotational output at a third speed that is lower than the second speed. The second reduction gear set 16 is capable of mechanical communication with the turbine rotor 20 such that the turning gear rotational output is translated to the turbine rotor 20, causing the turbine rotor 20 to slowly rotate.

The disengagement assembly 18 is in mechanical communication with the clutch assembly 12 and the second reduction gear set 16. The disengagement assembly 18 is configured to cause the second reduction gear set 16 to disengage from the turbine rotor 20 in response to a mechanical torque from an over-speed signal 19 from the clutch assembly 12.

Figure 2:
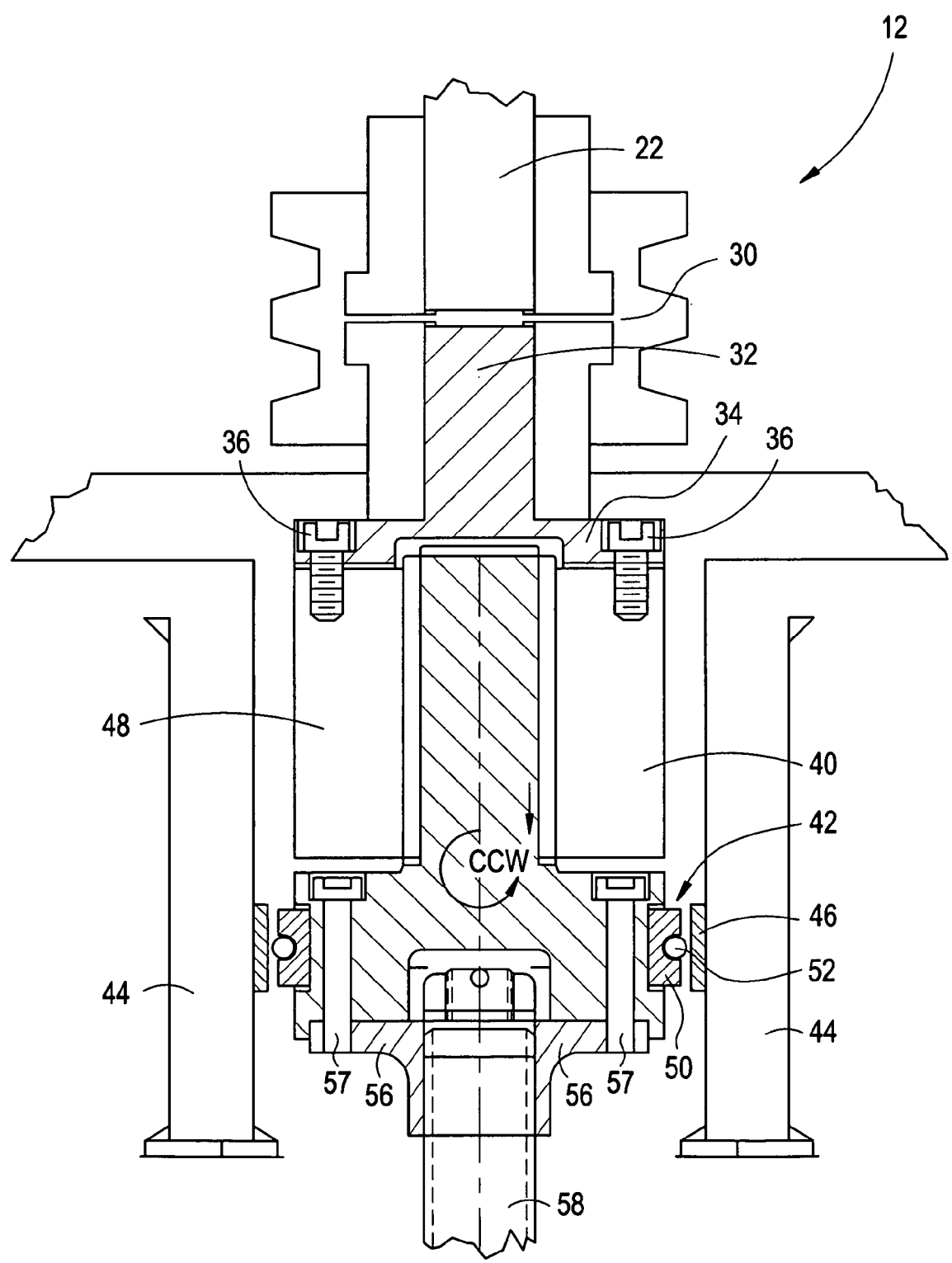
FIG. 2 illustrates a partial cross section view of a clutch assembly according to an exemplary embodiment.

FIG. 2 illustrates a partial cross section view of the clutch assembly 12 according to an exemplary embodiment. The clutch assembly 12 includes a flexible coupling 30, an input shaft 32, a flange 34, holding bolts 36, an overrunning clutch 40, a centrifugal clutch 42, a housing 44, a friction plate 46, and an output shaft 48.

Referring now to FIGS. 1 and 2, the input shaft 32 is in mechanical communication with the motor shaft 22 via the flexible coupling 30. The flexible coupling 30 translates rotation of the motor shaft 22 at the first speed to the input shaft 32. The input shaft 32 is in mechanical communication with the flange 34. In an exemplary embodiment, the input shaft 32 and the flange 34 are integrally formed as a single component. The flange 34 is in mechanical communication with the overrunning clutch 40 via the holding bolts 36. The holding bolts 36 combine the flange 34 to the overrunning clutch 40. The overrunning clutch 40 is disposed to receive a portion of the output shaft 48. In an exemplary embodiment, the overrunning clutch 40 is a sprag clutch having a hollow cylindrical shaped void, with the output shaft 48 inserted into the void. The overrunning clutch 40 is configured to translate torque from the input shaft 32 to the output shaft 48, but not translate torque from the output shaft 48 to the input shaft 32. In other words, if steam leakage causes the turbine rotor to rotate at a speed faster than that provided by the electric motor 10, a torque transmitted from the turbine rotor 20 to the first and second reduction gear sets 14 and 16 will not be translated to the electric motor 10 since the overrunning clutch will allow the output shaft 48 to turn at a speed higher than that of the input shaft 32.

The centrifugal clutch 42 and the overrunning clutch 40 are both disposed within the housing 44. A portion of the housing 44 corresponding to the centrifugal clutch 42 and the overrunning clutch 40 is substantially shaped as a hollow cylinder. The centrifugal clutch 42 is disposed at a portion of the output shaft 48, which is not inserted into the void of the overrunning clutch 40. In an exemplary embodiment, the friction plate 46 is disposed around a circumference of an interior surface of the housing 44 at a portion of the housing corresponding to the centrifugal clutch 42. The friction plate 46 comprises a material, kevlar, for example, adapted to providing a frictional resistance to the centrifugal clutch 42 when a portion of the centrifugal clutch 42 contacts the friction plate 46.

In an exemplary embodiment, the centrifugal clutch 42 includes clutch pads 50 and a coil spring 52. The clutch pads 50 are disposed at intervals around a circumference of an exterior surface of the output shaft 48. In an exemplary embodiment, six clutch pads 50 are disposed at the exterior surface of the output shaft 48. The coil spring 52 is disposed around the clutch pads 50 and exerts a force on the clutch pads 50, which tends to keep the clutch pads 50 in contact with the output shaft 48. The coil spring 52 is configured to maintain the clutch pads 50 in a contact free relationship with the friction plate 46 whenever a speed of the output shaft 48 is below a predetermined level. If the speed of the output shaft 48 exceeds the predetermined level, the force exerted on the clutch pads 50 by the coil spring 52 is less than a centrifugal force that tends to extend the clutch pads 50 toward the friction plate 46 and the clutch pads 50 contact the friction plate 46. In an exemplary embodiment, the predetermined level corresponds to about 16 rpm of the turbine rotor 20. However, any suitable level may be selected. When the clutch pads 50 contact the friction plate 46, a resulting friction causes a drag force to slow the output shaft 48. The drag force acts as the over-speed signal 19, which is transmitted to the disengagement assembly 18. The over-speed signal 19 is a mechanical signal that relies only on the drag force to act, thereby increasing the reliability of the turning gear assembly 100.

The output shaft 48 is mechanically coupled to a keyed flange 56 by flange bolts 57. The keyed flange 56 is mechanically coupled to a first reduction gear input shaft 58. The first reduction gear input shaft 58 provides an input to the first reduction gear set 14 from the clutch assembly 12.

Figure 3:
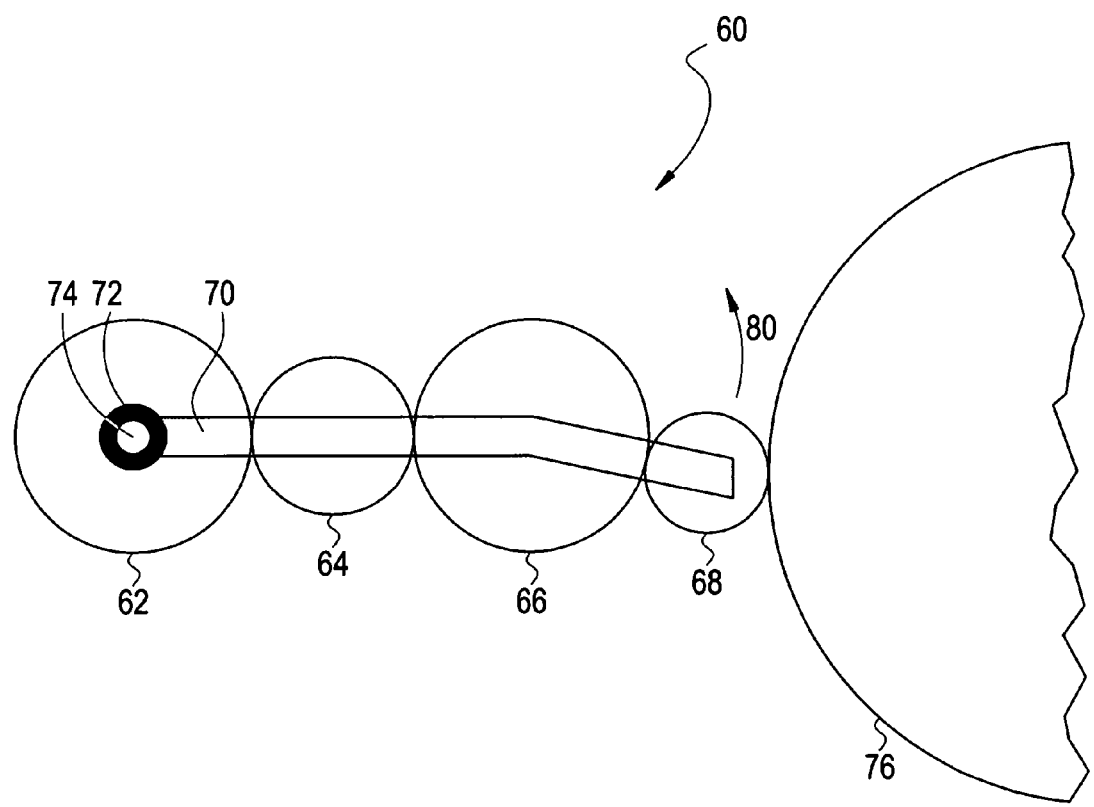
FIG. 3 shows a schematic diagram of a spur gear assembly engaged to a turbine rotor according to an exemplary embodiment.

FIG. 3 shows a schematic diagram of a spur gear assembly 60 engaged with the turbine rotor according to an exemplary embodiment. The spur gear assembly 60 includes a first spur gear 62, a second spur gear 64, a third spur gear 66, a clash pinion 68, a pinion engagement frame 70, an assembly input shaft 72, and a pivot point 74.

Referring to FIGS. 1, 2 and 3, the second reduction gear set 16 includes the spur gear assembly 60. Under normal operating conditions, the spur gear assembly 60 receives an input from an output of the first reduction gear set 14 at the first spur gear 62 via the assembly input shaft 72. The input is passed to the clash pinion 68, which is engaged with a ring gear 76 of the turbine rotor 20, through the first, second, and third spur gears 62, 64, and 66. Engagement between the clash pinion 68 and the ring gear 76 is maintained by the pinion engagement frame 70. The pinion engagement frame 70 has two positions relative to the pivot point 74. The pinion engagement frame 70 is either in an engaged position as shown in FIG. 3, or in a disengaged position. When the pinion engagement frame 70 is in the engaged position, the clash pinion 68 is engaged with the ring gear 76 of the turbine rotor 20. When the pinion engagement frame 70 is in the disengaged position, the clash pinion 68 is disengaged from the ring gear 76 of the turbine rotor 20 by pivoting about the pivot point 74 in the direction of arrow 80. In an exemplary embodiment, the pinion engagement frame 70 pivots about the pivot point 74 to the disengaged position in response to torque generated by the over-speed signal 19 being transmitted to the disengagement assembly 18.

It should be noted that although the spur gear assembly 60 of this exemplary embodiment has four gears, and the pivot point 74 is disposed at an axis of the first spur gear 62, any number of spur gears is possible and the pivot point 74 may be disposed at any suitable position along the pinion engagement frame 70. It should also be noted that although the clutch assembly 12 is disposed between the electric motor 10 and the first reduction gear set 14, any suitable location of the clutch assembly 12 is also envisioned.

The clutch assembly 12 described above permits continued engagement of a reduction gear assembly to the turbine rotor 20 despite an increase in rotational speed of the turbine rotor 20 above that provided by the electric motor 10 via the overrunning clutch 40. Additionally, if the rotational speed of the turbine rotor 20 reaches the predetermined level, which may indicate a startup of the turbine rotor 20, the centrifugal clutch 42 provides disengagement of the reduction gear assembly from the turbine rotor 20 without an electrical control signal.

In addition, while the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A turning gear assembly for turning a turbine rotor comprising:
    a motor configured to produce a first rotational output at a first speed;
    a clutch assembly in mechanical communication with said motor, said clutch assembly comprising:
    an overspeed clutch disposed at an input shaft;
    an output shaft in mechanical communication with said input shaft via said overspeed clutch;
    a centrifugal clutch disposed at a portion of said output shaft; and
    a housing disposed proximate to at least a portion of said centrifugal clutch;
    a reduction gear assembly in mechanical communication with said clutch assembly, said reduction gear assembly configured to produce a second rotational output at a second speed in response to receiving said first rotational output from said motor via said clutch assembly, said second speed being lower than said first speed, said reduction gear assembly configured to translate said second rotational output to the turbine rotor in response to engagement of said reduction gear assembly to the turbine rotor; and
    a disengagement assembly configured to allow disengagement of said reduction gear assembly from the turbine rotor.

2. The turning gear assembly of claim 1, wherein said housing clutch assembly further comprises a friction plate disposed proximate to said centrifugal clutch.

3. The turning gear assembly of claim 1, wherein said centrifugal clutch comprises a clutch pad and a coil spring.

4. The turning gear assembly of claim 3, wherein said coil spring is configured to maintain said clutch pad in a contact free relationship with said a friction plate disposed proximate to said centrifugal clutch in response to a rotational speed of said output shaft being below a predetermined level.

5. The turning gear assembly of claim 3, wherein said coil spring is configured to allow said clutch pad to contact said a friction plate disposed proximate to said centrifugal clutch in response to a rotational speed of said output shaft being above a predetermined level.

6. The turning gear assembly of claim 5, wherein said centrifugal clutch produces a mechanical over-speed signal in response to said rotational speed of said output shaft being above said predetermined level.

7. The turning gear assembly of claim 6, wherein said disengagement assembly disengages said reduction gear assembly from the turbine rotor in response to said mechanical over-speed signal.

8. The turning gear assembly of claim 1, wherein said overspeed clutch is configured to transmit torque from said input shaft to said output shaft and prevent transmission of torque from said output shaft to said input shaft.

9. The turning gear assembly of claim 1, wherein said reduction gear assembly comprises a first reduction gear set in mechanical communication with said clutch assembly and a second reduction gear set in mechanical communication with said first reduction gear set, said second reduction gear set capable of engagement to the turbine rotor.

10. The turning gear assembly of claim 1, wherein said motor is an electric motor.

11. The turning gear assembly of claim 1, wherein said clutch assembly is configured to translate torque from said motor to said reduction gear assembly and prevent transmission .of torque from said reduction gear assembly to said motor.

12. The turning gear assembly of claim 1, wherein said clutch assembly is configured to provide a drag force to said disengagement assembly to disengage said reduction gear assembly from the turbine rotor.

* * * * *